United States Patent [19]

Brogren et al.

[11] Patent Number: 4,559,817
[45] Date of Patent: Dec. 24, 1985

[54] HYDRODYNAMIC TEST APPARATUS WITH OFFSHORE STRUCTURE MODEL USING GAS BAG SEAL AT MODEL BOTTOM

[75] Inventors: Erik E. Brogren, Wheaton; Subrata K. Chakrabarti, Plainfield, both of Ill.

[73] Assignee: Chicago Bridge & Iron Company, Oak Brook, Ill.

[21] Appl. No.: 572,820

[22] Filed: Jan. 23, 1984

[51] Int. Cl.⁴ .............................................. G01M 10/00
[52] U.S. Cl. ...................................................... 73/148
[58] Field of Search .............................. 73/148, 432 J

[56] References Cited

U.S. PATENT DOCUMENTS 3,633,419  1/1972  Arita et al. .............................. 73/148
4,170,898  10/1979  Salter ..................................... 73/148

Primary Examiner—S. Clement Swisher
Attorney, Agent, or Firm—Marshall, O'Toole, Gerstein, Murray & Bicknell

[57] ABSTRACT

An inflatable air bag for filling and sealing the gap between the flat, underside of a model of a gravity-based, exploratory drilling structure, or the like, to improve the accuracy and reliability of data obtained from hydrodynamic forces acting on the model when the latter is under test. The bag is of substantially the same shape in plan as the underside of the model and is inflated with gas to a pressure sufficient to seal the gap and prevent hydrodynamic forces from acting on the underside of the model during testing. The material of the bag is of minimal thickness so as to minimize load transfer thereto. Variations in the internal pressure of the bag during a hydrodynamic test of the model is utilized to improve the accuracy and reliability of the data obtained from load cells which support the model in the test facility.

24 Claims, 5 Drawing Figures

STILL WATER LEVEL

HYDRODYNAMIC TEST APPARATUS WITH OFFSHORE STRUCTURE MODEL USING GAS BAG SEAL AT MODEL BOTTOM

BACKGROUND OF THE INVENTION (1) Field of the Invention

This invention relates to apparatus for conducting hydrodynamic tests on a model, and more particularly relates to an inflatable bag for sealing the gap between the underside of a model and the bottom of a tank in which the model is mounted to improve the accuracy of the data obtained while the model is undergoing hydrodynamic tests, and to a method of using the bag to obtain such data.

(2) Description of the Prior Art

The continuing development of offshore structures has been preceeded by the construction and testing of models of such structures in hydrodynamic test facilities, such as wave tanks. Such testing has been conducted to obtain data which may be used in the design of the full scale structures and which takes into account the loads applied by environmental forces, such as wind, waves, currents, and moving sheets of ice. Some of the structures which have undergone such tests are the so-called gravity-based types which are floatable to designated sites and there submerged to rest on the sea floor. When in place, the weight of such gravity-based structures is capable of resisting the expected environmental loads through the friction of the contact surfaces of the base and the foundation on which it is resting.

To improve the accuracy and reliability of the data obtained from tests of models of gravity-based exploratory structures, such models have been mounted in wave tanks and supported therein by load cells with the flat underside of the model spaced above the tank bottom. Such a set-up eliminated the errors that would otherwise be introduced into the data obtained from the output of the load cells due to frictional contact between the model and the tank bottom during tests. However, while the aforementioned set-up reduced errors, errors were sometimes introduced as a result of the hydrodynamic forces acting in the gap between the underside of the model and the bottom of the tank. Consequently, a need has existed for a structure or device, which could be used to prevent the aforementioned hydrodynamic forces from acting on the model in the gap and which could be used to obtain data that could be integrated with that obtained from the load cells so as to render the load cell data more accurate and reliable.

SUMMARY OF THE INVENTION

Briefly described, in its broader aspects, the present invention contemplates a resilient filler member that is adapted to be positioned in and seal the gap between the underside of a model under test in a hydrodynamic test facility, such as a wave tank, and the bottom of the tank, to improve the reliability of the test data. In its more specific aspects, the present invention contemplates a generally flat, thin-walled bag, which is of substantially the same shape as the underside of the model and which is positioned in the aforementioned gap and inflated with a sufficient quantity of gas under pressure, preferably compressed air, to fill and seal the gap. The material employed in the bag is of minimal thickness so as to minimize load transfer to such material. In addition, the physical properties of the bag are such as to eliminate the effects of temperature variations or pollutants in the water of the test tank.

The bag is preferably inflated with air and maintained at a head that is slightly greater than that of a column of water that corresponds to the highest wave amplitude that will occur during a particular test. Variations in the pressure in the bag due to the hydrodynamic forces acting on the model is sensed by a pressure transducer, the output from which is integrated with the outputs from load cells which support the model in the test tank to correct the data obtained from the load cells.

Accordingly, it is a general object of the present invention to provide a novel seal in the form of a resilient member for closing the gap between the underside of a model in a hydrodynamic test apparatus, such as a wave tank, to improve the accuracy and reliability of the data obtained from the load cells which support the model in the tank.

A more particular object is to provide an inflatable air bag for sealing the gap between the underside of a model and the bottom of a hydrodynamic test facility in which the model is mounted, to prevent hydrodynamic forces from acting in the gap and adversely affecting data obtained from load cells which support the model on the bottom of the test facility.

A specific object is to provide an inflatable air bag for sealing the gap between the flat underside of a model of an offshore, gravity structure and the bottom of a wave tank in which the model is mounted to improve the accuracy of the data obtained from the load cells which support the model in the tank while the model is being tested.

These and other objects will become apparent from the following detailed description and accompanying sheets of drawings.

DESCRIPTION OF THE PREFERRED EMBODIMENTS

Figure 1:
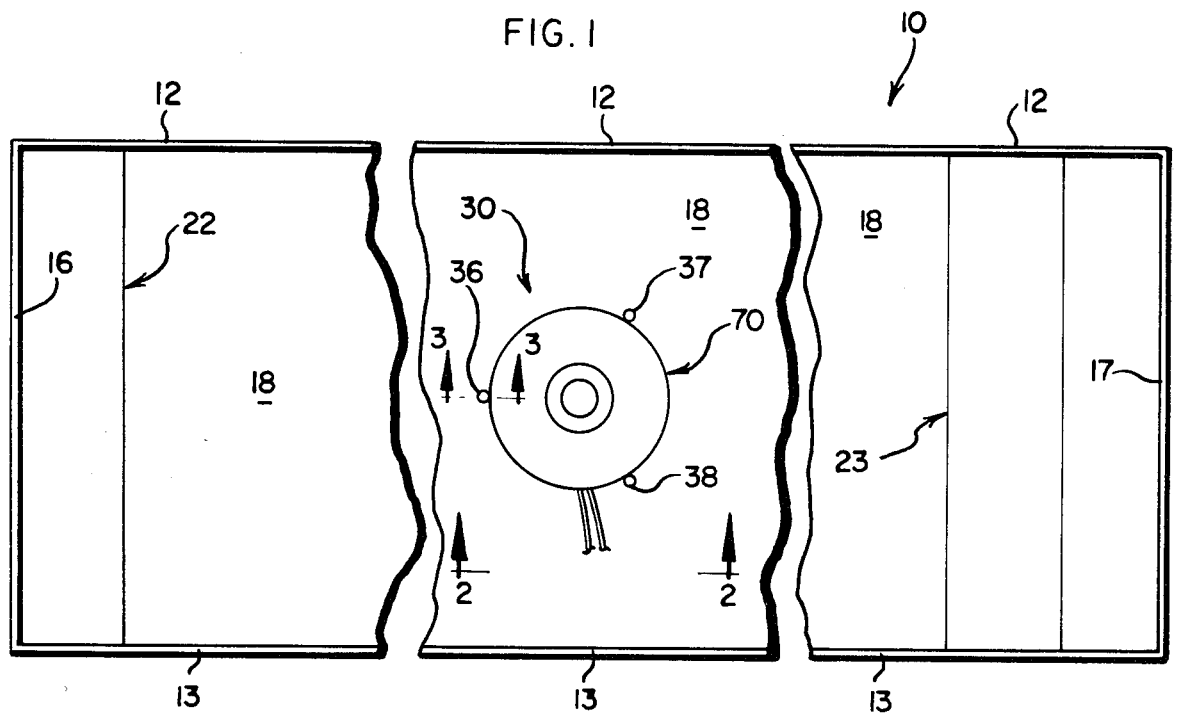
FIG. 1 is a broken, semi-diagrammatic top plan view of a wave tank showing the approximate position that a model of an offshore structure to be tested would occupy when mounted in the tank with a gas bag embodying the features of the present invention operatively positioned in a gap between the underside of the model and the bottom of the tank.

In FIG. 1, a hydrodynamic test apparatus, specifically, a wave tank, is fragmentarily illustrated and indicated generally at 10. The tank 10 is conventional to the extent that it is generally rectangular in plan and has upstanding, opposite pairs of side walls 12 and 13, opposite end walls 16 and 17, and a bottom. The bottom is provided by a flat plate 18, which rests on a foundation 19 of concrete or the like. A wave generator, indicated generally at 22, is provided in the tank adjacent to the end 16, and a beach, indicated generally at 23, is provided in the tank 10 adjacent to the end wall 17. One or more supply inlets (not shown) and one or more drain outlets (also not shown) are provided for raising or lowering the level of test liquid therein. In this regard, it will be assumed that the test liquid utilized in the tank 10 is fresh water. However, salt water, or other liquids, could also be employed.

Figure 3:
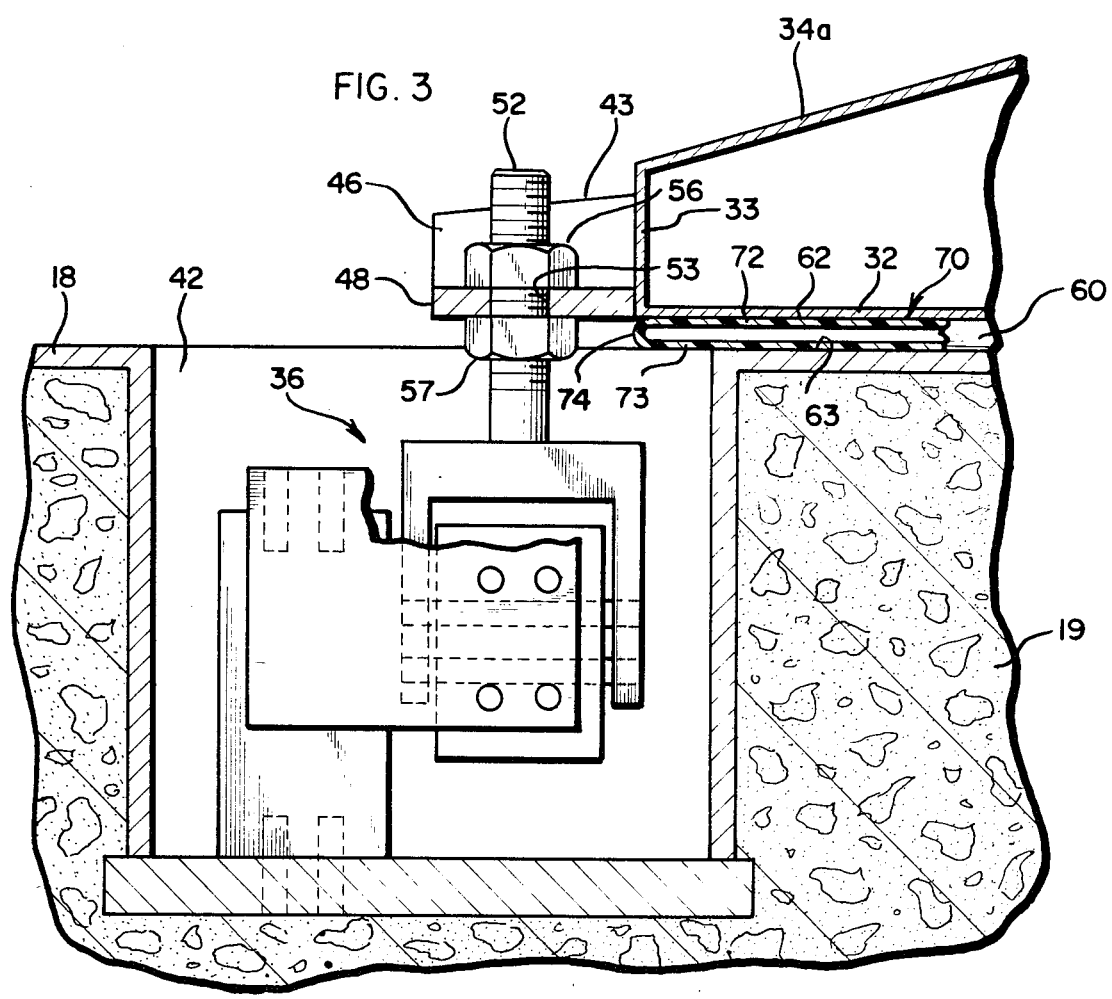
FIG. 3 is an enlarged, fragmentary vertical sectional view, with some parts in elevation, of one of the three load cells which support the model illustrated in FIGS. 1 and 2 in the tank.
Figure 2:
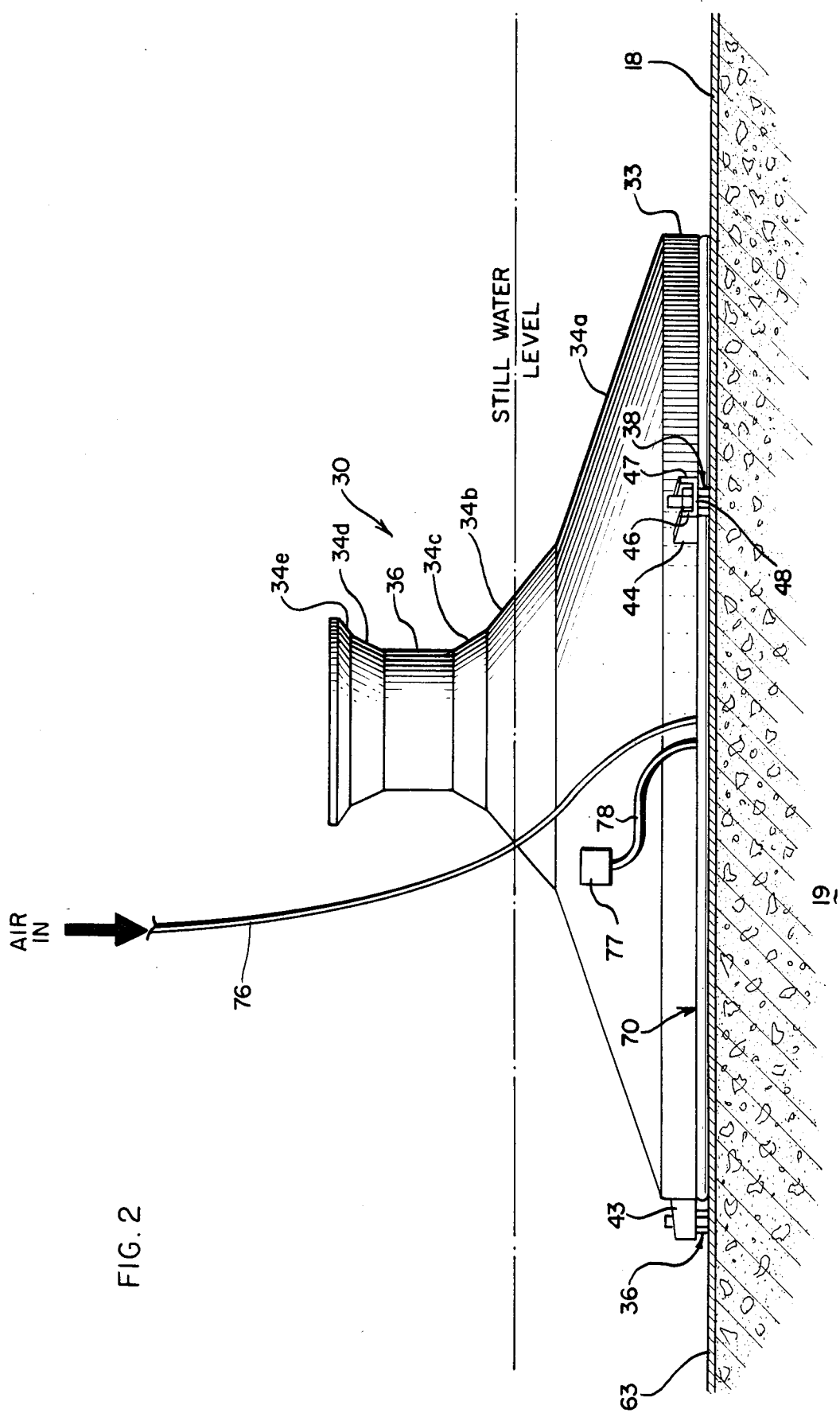
FIG. 2 is an enlarged, vertical sectional view, taken substantially along the line 2—2 of FIG. 1.

Referring now to FIGS. 2 and 3 in conjunction with FIG. 1, it will be seen that a model to be tested, indicated generally at 30, is shown as it would appear when mounted in the tank 10. The model 30, in the present instance, is a model of an offshore structure, which may be used as a platform for exploratory drilling, production, storage of oil or drilling supplies or other purposes where ice is expected to form. When in place, the closed bottom of the structure rests on the sea floor in what may be termed a sealed gravity structure.

Referring now to FIG. 3 in conjunction with FIGS. 1 and 2, it will be seen that the model 30 includes a circular continuous base 32 (FIG. 3), a shallow, upstanding cylindrical side wall 33, and a series of frusto-conical portions 34a, 34b, 34c, 34d, and 34e, the conical portions 34a–34c being vertically convergent, the conical portions 34d and 34e being vertically divergent. An intermediate cylindrical portion 36 separates the frusto-conical portions 34c and 34d. The interior of the model 10, in the present instance, is hollow.

The model 30, in the present instance, is supported on the bottom 18 of the tank 10 by a plurality of supports in the form of at least one and preferably three equidistantly circumferentially spaced load cells, respectively indicated at 36, 37, and 38 in FIG. 1. Each of the load cells 36–38, inclusive, are identical and are of the X-Z type and capable of providing outputs proportional to changes in the load on the cells in two dimensions. Thus, the load cells 36–38, inclusive, are capable of measuring changes in the vertical and horizontal loads (from which overturning moments can be developed), applied thereto from the model 30 when the latter is under test. As shown in FIG. 3, the load cells 36–38, inclusive, are respectively mounted in recesses or cavities in the bottom 18 of the tank 10, only the cavity 42 for the load cell 36 being shown in FIG. 3.

To connect the model 30 to the load cells 36–38, three circumferentially spaced, radially outwardly extending mounting pads are secured to the side wall portion 33 of the model, two of which are illustrated in FIG. 2 and indicated at 43 and 44. Each of the mounting pads 43 and 44 is preferably channel-shaped in cross section and arranged with the flanges 46 and 47 thereof extending upwardly from the horizontal web 48 of the pad.

Each of the load cells 36–38, inclusive, includes an upstanding, threaded post 52, which extends through an opening 53 in the web 48 of the pad to laterally locate the model in the tank. A pair of vertically spaced nuts 56 and 57 are threaded onto the post 52 and respectively arranged to engage the upper and lower surfaces of the web 48 to permit adjustment of the vertical position of the model 30 with respect to the bottom 18 of the tank.

In this regard, the nuts 56 and 57 of each of the load cells 36–38, inclusive, are adjusted on the posts 52 so that when the nuts are engaged with the upper and lower surfaces of the webs 48 of their respective mounting pads, a small gap, indicated at 60 in FIG. 2, is present between the flat underside, indicated at 62, of the base 32 of the model and the flat upper surface, indicated at 63, of the bottom 18 of the tank. By way of example, if the outside diameter of the cylindrical side wall 33 of the model 30 is about eleven inches, the vertical dimension of the gap 60 is preferably between about ¼ to ¾ of one inch when the model is mounted in the tank 10 in readiness for a test. It will be understood, however, that the width of the gap 60 could vary and be either greater or less than the previously mentioned range.

The provision of the gap 60 between the underside 62 of the model 30 and the upper surface 63 of the tank bottom 18 is desirable to prevent the model from contacting the tank bottom, while the model is undergoing a test, so that a portion of the weight load of the model is not transferred to the tank bottom and so that undesirable frictional forces are not developed as a result of such contact. The gap is undesirable, however, from the standpoint that hydrodynamic forces from the waves and currents generated by the wave and current generators 22 may act against the underside 62 of the model and thus introduce errors in the loads sensed by the load cells 36–38, inclusive. Thus, the load cells 36–38, inclusive, could provide erroneous test data with respect to the vertical and horizontal loads being imposed on the model 30 by the waves and currents generated by the wave generator 22, and also with respect to the overturning moments imposed on the model.

To eliminate the aforementioned adverse effects of hydrodynamic forces acting on the underside of the model 30, the present invention contemplates the provision of means for filling and sealing the gap 60. Such filling and sealing means preferably comprises a resilient member in the form of an inflated bag, which is preferably equal in size to the base 32 of the model 30 and which is positioned in the gap 60 between the underside 62 of the model and the upper surface 63 of the tank bottom prior to starting a test sequence. Such bag is indicated generally at 70 in FIGS. 1, 2, and 3, and includes upper and lower portions or walls 72 and 73, which respectively engage the underside 62 of the base 32 and the upper surface 63 of the tank bottom 18, in surface-to-surface relation, when the bag is filled with gas under pressure, such as compressed air. The upper and lower portions 72 and 73 are preferably of a disk-like configuration and are connected to each other by an integral peripheral edge portion 74, which is either flush with the edge or extends somewhat beyond the peripheral edge or cylindrical side wall 33 of the model.

As previously mentioned, the bag 70 is positioned in the gap 60 so that when the bag is inflated, it will fill and close the gap and thus prevent hydrodynamic forces from the wave generator 22 from acting against the underside 62 of the model 30 when the latter is being tested. By way of example, if twelve inch wave tests are run when the still water depth in the tank 10 is about 26.4 inches, 21.6 inches, 16.8 inches, and 12 inches, the air pressure in the bag necessary to achieve the desired sealing of the gap 60 will be approximately equal to vertical columns of water of about 35 inches, 31 inches, 25 inches, and 21 inches, respectively, for the aforementioned still water depths.

In this regard, it is preferred that the material of the bag be of moderate elastic properties, having high tensile strength and capable of being easily joined together. Moreover, the material of the bag is preferably such as will not be affected by variations in the temperature of the water in the tank 10 or adversely affected by typical water pollutants. Some examples of materials which are suitable for use in the construction of the bag 70 are sheets or films of polymeric materials such as polyvinylchloride, polyethylene, natural rubber compounds, or synthetic rubber compounds such as Neoprene and Buna-N.

To substantially eliminate any load absorption by the material of the bag 70, the thickness of the material thereof may range from between about 0.001 to about 0.065 inches. In addition, the bag 70 should substantially conform to the "footprint" of the model 30. However, the diameter of the bag is preferably no larger or smaller than that of the base 32. While the upper and lower portions 62 and 63 are preferably of a disk-like form, they could also be of some other shape, such as annular.

Compressed air or any other gas may be supplied in any convenient manner to the interior of the bag 70 to inflate the same and fill the gap 60. However, as shown in FIG. 2, such air is supplied to the bag 70 through a hose 76, one end of which is connected to the interior of the bag 70 and the opposite end of which is connected to a suitable source of air under pressure, such as an air compressor for bag inflation purposes. When the bag is inflated to a specified pressure, the hose is then closed off.

The pressure of the air in the bag 70 at any instant is sensed by a pressure transducer, indicated generally at 77, which may be connected to the interior of the bag 70 by another hose 78. Wires (not shown) are connected to the pressure transducer 77 and serve to transmit the output or control signal therefrom to suitable test equipment (also not shown). Thus, the output from the pressure transducer 77, as well as the outputs from the load cells 36–38, inclusive, are integrated by the test equipment to provide data indicative of the vertical and horizontal forces acting on the model 30 when the latter is under test, as well as the overturning moments acting on the model. The resulting data obtained from the load cells 36–38, inclusive, is thus rendered more accurate and reliable when applied to the design of a full scale structure, such as an offshore structure.

Figure 4:
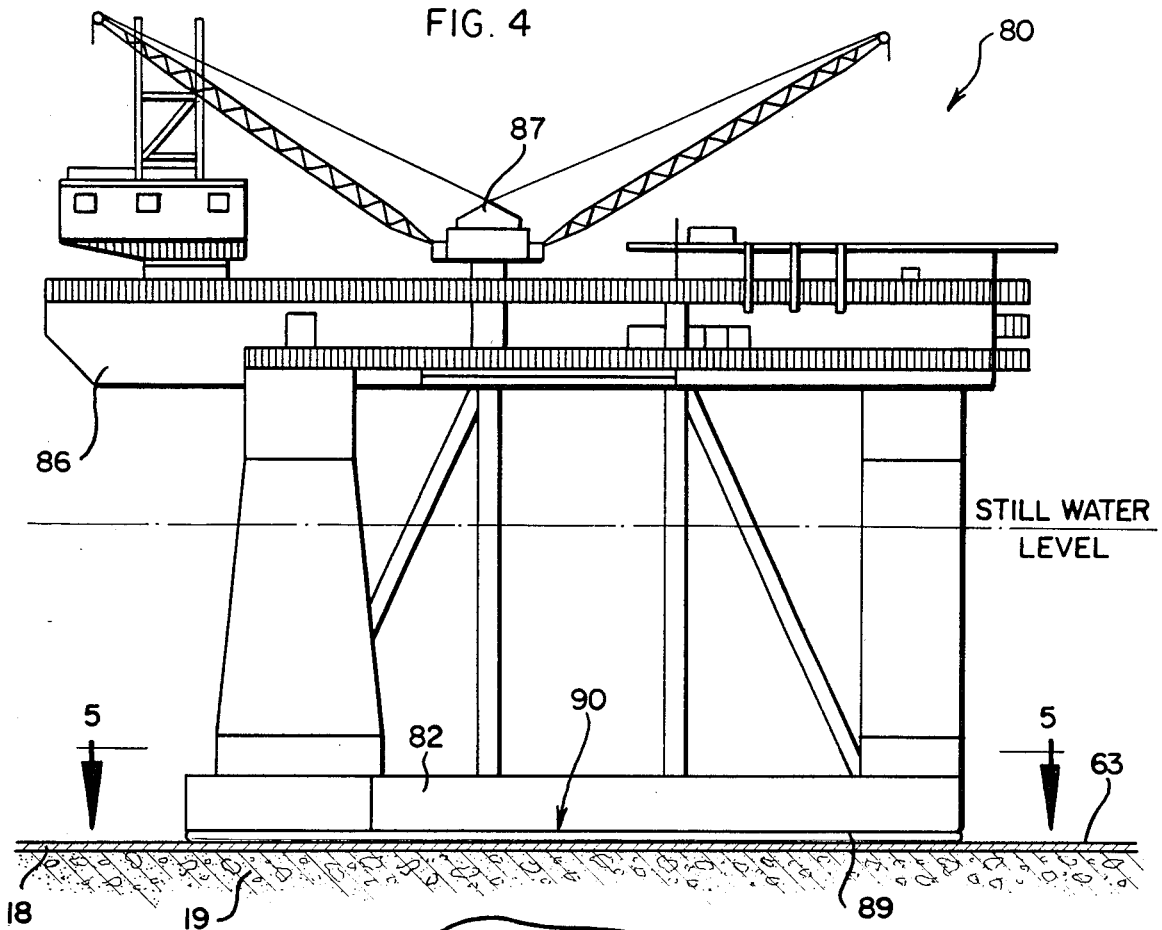
FIG. 4 is a vertical sectional view, similar to FIG. 2, of a model of a transportable submersible offshore structure as the latter would appear when mounted on the bottom of a test tank with an inflated gas bag interposed in the gap between the underside of the model and the bottom of the tank.

Referring now to FIG. 4, a model of a portable submersible offshore structure is indicated generally at 80 and illustrated as it would appear when mounted in a hydrodynamic test apparatus. It will be assumed that the model 80 is mounted in the wave tank 10.

Figure 5:
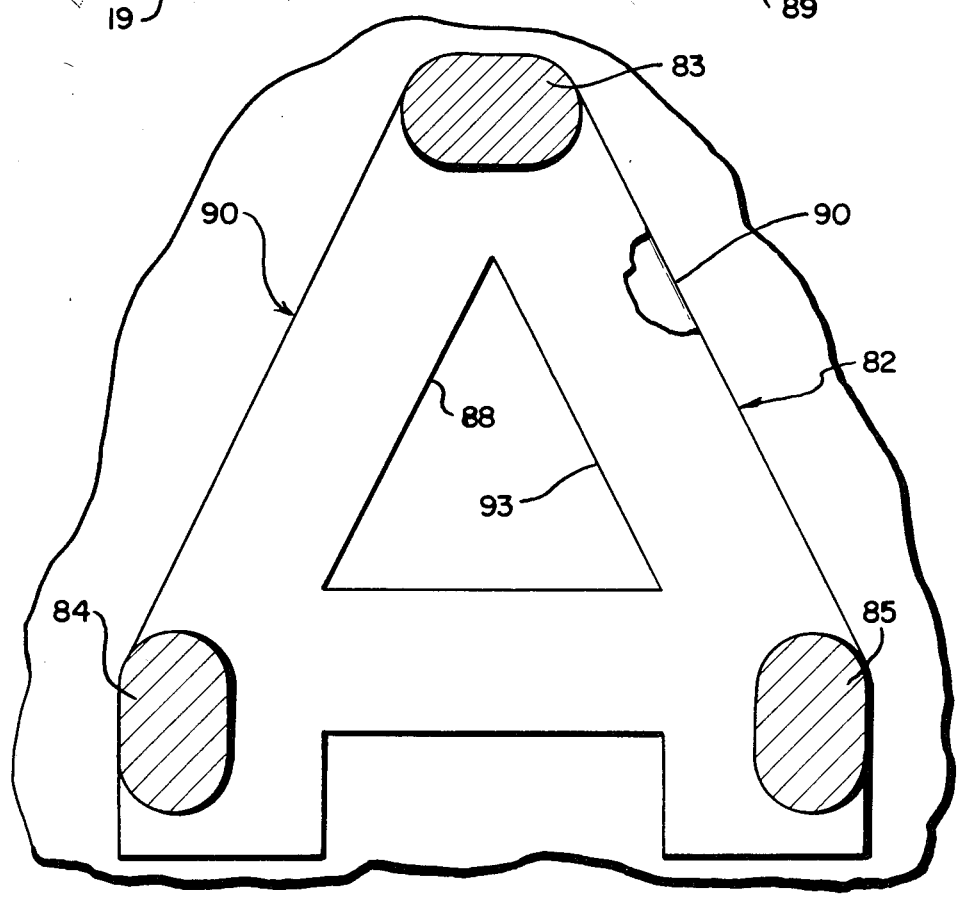
FIG. 5 is a horizontal sectional view, taken substantially along the line 5—5 of FIG. 4.

The model 80, in the present instance, is of an exploratory, offshore drilling structure and includes a platform or mat 82, which is generally triangularly-shaped in plan, as illustrated in FIG. 5. Three columns, respectively indicated at 83, 84, and 85, extend upwardly from the corners of the mat 82 and serve to support a superstructure, indicated generally at 86. A derrick 87 and other equipment, incident to the operation of an offshore drilling rig, are shown mounted on the superstructure 86.

The mat 82 of the model 80 may be provided with horizontally outwardly extending mounting pads (not shown), similar to the pads 43 and 44 of the model 30 or close to the corners of the pad 82 for receiving the upstanding posts (also not shown) of a corresponding number of load cells (likewise not shown), similar to the load cells 36–38, inclusive. The load cells may be mounted in recesses 42 in the bottom of the tank in the same manner as the load cells 36–38, inclusive. Thus, when the pad 82 is engaged with the load cells, the pad underside, indicated at 89, of the pad 82 will be spaced slightly above the upper surface 63 of the bottom 18 of the wave tank so that a gap is established between the underside 89 of the mat and the upper surface 63 of the tank bottom 18, in the same manner as the gap 60 of the previous embodiment. Consequently, hydrodynamic forces in the wave tank in which the model 80 is mounted could act on the underside of the pad 82 and adversely affect the data obtained from the load cells which support the model 80 in the tank.

To prevent the aforementioned adverse affect from occurring, the present invention contemplates the provision of means for filling and sealing the aforementioned gap. Such filling and sealing means preferably comprises a resilient member in the form of an inflated bag, indicated generally at 90, which is positioned in the gap between the underside 89 of the model 80 and the upper surface 63 of the tank bottom 18 for closing this gap and preventing the aforementioned hydrodynamic forces from acting against the underside 89 of the model 80 when the latter is under test. The inflated bag 90 thus performs the same function with respect to the pad 82 of the model 80 as does the inflated bag 70 of the previous embodiment. In addition, the thickness of and type of material employed in the bag 90 is likewise the same as that of the bag 70.

As in the previous embodiment, air under pressure may be supplied to the interior of the bag 90 through a hose (not shown), and a pressure transducer (also not shown), similar to the transducer 77, may be connected to the interior of the bag 90 for sensing variations in the pressure in the bag when the model 80 is under test and providing an output or signal, which may be integrated with the outputs from the load cells at the corners of the mat to improve the accuracy and reliability of the test data.

The bag 90 is also similar to the bag 70 in that the bag 90 is of substantially the same shape as, but preferably not larger or smaller in plan than, the "footprint" of the mat 82. Thus, since the mat 82 is substantially triangularly-shaped in plan and has an open, triangularly-shaped central portion 88, the central portion of the bag 90, indicated at 93, is likewise open and preferably triangularly-shaped.

From the foregoing description, it will now be apparent that the air bags 70 and 90 of the present invention coact with their respective models 30 and 80 to improve the accuracy and reliability of the data obtained from load cells which support the models in a hydrodynamic test facility when the models are undergoing hydrodynamic tests. These advantages are achieved when the bags are respectively positioned in the gaps between the undersides of the models and the upper surface of the tank bottom, and inflated to predetermined pressures sufficient to cause the bags to fill and seal the gaps and prevent hydrodynamic forces from acting on the undersides of the models and introducing errors into the data received from the load cells. Moreover, when the bags are positioned in the gaps and inflated, fluctuations in the pressure in the bags, due to the action of waves on the models, provides another source of data which is utilized to improve the accuracy and reliability of the test data obtained from the load cells.

While two embodiments of the invention have been herein illustrated and described in detail, it will be understood that modifications and variations thereof may be affected without departing from the spirit of the invention and the scope of the appended claims.

What is claimed is:

1. Apparatus for testing a model of a gravity-based offshore structure, and obtaining data therefrom for predicting the effects of hydrodynamic forces caused by waves on a full size structure, said test apparatus comprising a model, a wave tank having bottom, side, and end walls and being adapted to contain a predetermined quantity of water, means for generating waves in said tank, support means carried by the bottom of said tank for supporting said model therein, the underside of said model being substantially flat and spaced above the bottom of said tank when supported by said support means so that a gap is defined between said flat underside and said tank bottom, said support means including at least one load cell having an output proportional to changes in the load on and displacement of said model in at least one direction, and means for filling and sealing the gap between the bottom of said model and the bottom of said tank for preventing hydrodynamic forces from acting on the underside of said model during testing, whereby the test data obtained from said load cell is rendered more accurate and reliable.

2. The apparatus of claim 1, in which the outer periphery of said filling and sealing means is substantially congruent to the outer periphery of the bottom of said model.

3. The apparatus of claim 2, in which the outer periphery of the bottom of said model is circular.

4. The apparatus of claim 2, in which the outer periphery of the bottom of said model is substantially triangular.

5. The apparatus of claim 3, in which the outer periphery of said filling and sealing means does not project beyond the outer periphery of the bottom of said model.

6. The apparatus of claim 1, in which said filling and sealing means comprises a resilient bag.

7. The apparatus of claim 6, in which said bag is filled with gas under pressure.

8. The apparatus of claim 7, in which said gas comprises compressed air.

9. The apparatus of claim 7, in which at least one pressure transducer is connected to the interior of said bag, and said pressure transducer is operable to sense changes in the pressure in said bag due to displacements of said model when the latter is under test and to provide an output proportional to and integratable with the output from said load cell for rendering said test data more accurate and reliable.

10. In an apparatus for testing the effects of hydrodynamic forces, such as waves, on a model of a stationary structure to obtain data applicable to the design, construction and operation of a full size structure, the underside of said model being substantially flat, said apparatus including a model, a tank having bottom, side, and end walls for retaining a test liquid therein, means for producing waves in said tank, and support means carried by the bottom of said tank for supporting said model above the bottom of said tank so that a gap is defined between the flat underside of said model and the bottom of said tank, said support means including at least one load cell for providing at least a portion of said data, the improvement of a resilient filler member adapted to fill said gap and prevent hydrodynamic forces from acting on the underside of said model when the latter is under test, whereby the data obtained from said load cell is rendered more accurate and reliable.

11. The improvement of claim 10, in which said resilient filler member comprises a bag filled with gas under pressure.

12. The improvement of claim 11, in which said gas comprises air.

13. The improvement of claim 11, in which the material of said bag is flexible.

14. The improvement of claim 13, in which the material of said bag is polyvinylchloride.

15. The improvement of claim 13, in which the material of said bag is polyethylene.

16. The improvement of claim 13, in which the material of said bag is natural rubber.

17. The improvement of claim 13, in which the material of said bag is synthetic rubber.

18. The improvement of claim 13, in which the thickness of the material of said bag is between about 0.001 to about 0.065 inches.

19. The method of obtaining more accurate and reliable data from at least one load cell which supports at least a portion of a model of a stationary, gravity based, offshore drilling structure in a wave tank when the model is under test and subjected to the hydrodynamic effects of waves in the tank, and impinging on said model, said load cell having an output that is proportional to the hydrodynamic forces acting on said model in at least one direction, said model having a flat underside and said load cell being carried by the bottom of said tank, said method comprising the steps of securing said model to said load cell so that the underside thereof is spaced from the bottom of said tank to provide a gap therebetween, and interposing a resilient member in said gap so that said resilient member fills said gap and prevents hydrodynamic forces from acting on the underside of said model when the latter is under test.

20. The method of claim 19, which includes the additional steps of forming said resilient member as a closed bag formed resilient material, and filling said bag with a gas under pressure.

21. The method of claim 20, which includes the additional step of inflating said bag until the pressure therein is at least equal to the hydrostatic head of the still water level in the wave tank.

22. The method of claim 21, which includes the additional step of inflating said bag until the pressure therein is at least equal to the hydrostatic head of a column of water equal to the highest wave amplitude that will impinge on the model under test.

23. The method of claim 20, which includes the additional step of connecting a pressure transducer to said bag so that said transducer senses changes in the pressure in said bag while said model is under test and provides an output proportional to said pressure changes, and integrating the output from said pressure transducer with the output from said load cell.

24. The method of claim 23, which includes the additional steps of providing a plurality of said load cells in said wave tank for sensing changes in the vertical and horizontal loads applied thereto from said model, arranging said load cells in generally symmetrically spaced relation around the periphery of said model, and integrating the output from said pressure transducer with the outputs from said load cells.

* * * * *